United States Patent
Roulet et al.

(10) Patent No.: US 10,356,400 B2
(45) Date of Patent: *Jul. 16, 2019

(54) METHOD FOR DESIGNING AN OPTIMIZATION APPARATUS FOR A CAMERA HAVING A LENS WITH NON-UNIFORM PARAMETERS TO BE IMAGED AS A LENS WITH UNIFORM PARAMETERS

(71) Applicant: 6115187 Canada, Montreal (CA)

(72) Inventors: Patrice Roulet, Montreal (CA); Jocelyn Parent, Montreal (CA); Xiaojun Du, Montreal (CA); Pierre Konen, Saint-Bruno (CA); Simon Thibault, Quebec (CA); Pascale Nini, Montreal (CA)

(73) Assignee: 6115187 Canada, Inc., Montreal (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/895,672

(22) Filed: Feb. 13, 2018

(65) Prior Publication Data

US 2018/0176552 A1 Jun. 21, 2018

Related U.S. Application Data

(63) Continuation of application No. 15/260,956, filed on Sep. 9, 2016, now Pat. No. 9,930,326.

(Continued)

(51) Int. Cl.
*H04N 17/00* (2006.01)
*G02B 27/00* (2006.01)
(Continued)

(52) U.S. Cl.
CPC .......... *H04N 17/002* (2013.01); *G02B 13/06* (2013.01); *G02B 27/0025* (2013.01); *G06T 3/00* (2013.01);
(Continued)

(58) Field of Classification Search
CPC .............. G02B 13/06; G02B 27/0025; G02B 27/0012; G02B 3/00; G06T 3/00;
(Continued)

(56) References Cited

U.S. PATENT DOCUMENTS

| 7,852,513 | B2 | 12/2010 | Donomae |
| 8,619,248 | B2 | 12/2013 | Bassi et al. |
| 9,930,326 | B2 * | 3/2018 | Roulet ................ H04N 17/002 |

* cited by examiner

*Primary Examiner* — Tri T Ton
(74) *Attorney, Agent, or Firm* — Panitch Schwarze Belisario & Nadel LLP (57) ABSTRACT

An optimization apparatus for a camera system having lenses with at least one non-uniform parameter and a method to design them is disclosed. When the non-uniform parameter of the lenses is the presence of optical distortion, the image of the objects inside the optimization apparatus are deformed. Embodiments of the invention allow designing of optimization apparatuses using 2D or 3D objects pre-distorted according to the exact distortion profile of the lens. When viewed by a camera system with a lens having optical distortion, the image of the pre-distorted apparatus appears undistorted, and can be automatically analyzed with existing software programs or be compared to existing images by human observers.

14 Claims, 5 Drawing Sheets

Related U.S. Application Data

(60) Provisional application No. 62/216,105, filed on Sep. 9, 2015.

(51) Int. Cl.
  *G02B 13/06* (2006.01)
  *G06T 3/00* (2006.01)
  *G06T 5/00* (2006.01)
  *G06T 7/80* (2017.01)
  *H04N 5/357* (2011.01)

(52) U.S. Cl.
  CPC ............ *G06T 3/0012* (2013.01); *G06T 5/006* (2013.01); *G06T 7/80* (2017.01); *H04N 5/3572* (2013.01)

(58) Field of Classification Search
  CPC ......... G06T 3/0012; G06T 5/006; G06T 7/80; G06T 2207/10004; G06T 2207/10028; G06T 2207/10152; G06T 7/0018; G06T 7/004; G06T 7/0051; H04N 17/002; H04N 5/3572
  USPC .................................................. 356/124–137
  See application file for complete search history.

METHOD FOR DESIGNING AN OPTIMIZATION APPARATUS FOR A CAMERA HAVING A LENS WITH NON-UNIFORM PARAMETERS TO BE IMAGED AS A LENS WITH UNIFORM PARAMETERS

CROSS-REFERENCE TO RELATED APPLICATIONS

This application is a continuation of U.S. patent application Ser. No. 15/260,956, filed Sep. 9, 2016, entitled, "Method for Designing an Optimization Apparatus for a Camera having a Lens with Non-Uniform Parameters to Be Imaged as a Lens with Uniform Parameters," currently pending, which claims the benefit of U.S. Provisional Patent Application No. 62/216,105, filed Sep. 9, 2015, entitled "Method for Designing an Optimization Apparatus for a Camera having a Lens with Non-Uniform Parameters to Be Imaged as a Lens with Uniform Parameters," the entire contents of all of which are incorporated by reference herein.

BACKGROUND OF THE INVENTION

The present invention relates to optical lenses having an inherent non-uniform parameter and their image on a given camera system. More specifically, the invention relates to a method for designing an optimization apparatus to be used with these cameras and lenses with non-uniform parameters to improve the overall performance of the system. This optimization apparatus can be used for calibration, tuning, measuring, testing or the like.

For regular optical lenses having no significant non-uniform parameters, there are many existing kinds of optimization apparatuses for optimizing the performance of the cameras. Such apparatuses include an optical bench or an enclosure box in which one or more objects having precise shapes or characteristics are placed at precise locations in order to create some constant conditions for the optimization of performance. This optimization includes calibration, tuning, characterization, and more. Objects commonly found on these benches or inside these boxes includes common charts, light sources with well-known emission spectra and intensities, everyday familiar objects or shapes (including human-shaped dummies), light diffusers, items with specific color or shades of grey, or the like. More specifically, common existing charts include some brightness charts (with pre-defined patches of black, grey and white), color charts (with pre-defined patches of color), resolution charts (with combinations of vertical and horizontal alternating black and white lines of different spacing), distortion charts (with a known position in object space of various grid points), image quality charts (with slanted edge parallelograms for numerical image quality or Siemens stars for visual image quality), and more.

With the existing optimization apparatus, the analysis of the results and the corresponding tuning of the camera are most often automated by software programs. The rest of the time, these analyses are done manually using more subjective criteria depending on the person viewing the resulting images. A program or a human viewing the images can recognize the exact objects inside the images as well as the conditions used to capture the images, including the light spectrum and the light intensity. For common objects that are usually part of these existing optimization apparatuses, the programs can also do mathematical calculations based on the image of the objects through the camera system while the human can do subjective comparisons based on experience with other lens and camera systems.

However, when the optical lens in the camera system has a non-uniform parameter, such as distortion, magnification, relative illumination, resolution, image quality (MTF), anamorphic ratio between two principal axes and the like, the captured images of these existing optimization apparatuses are deformed or altered. The consequence of these deformed or altered images is that the existing automated analysis (e.g., tuning) software cannot recognize the objects, or an incorrect analysis is provided due to the different information being processed. For human analysis of the images, the unusual shape, color, or texture of the objects visible inside the images also make it harder to compare the results with images from standard lenses having no significant non-uniform parameters.

Furthermore, one common example of lenses with a non-uniform parameter is a lens with optical distortion having non-uniform magnification across the field of view. These lenses often have wide-angle field of view. When using these lenses on an existing optimization apparatus, such as a conventional bench or inside a conventional box, the useful objects for the analysis and tuning are often placed in only a central part of the field of view and nothing useful is imaged at the edges of the field of view. Worse, light sources used to create uniform lighting conditions in the image and that shouldn't be part of the image may be imaged by these wide-angle lenses. With these wide-angle lenses, the objects also cover significantly less pixels, making the interpretation of the images by a software program or a human even more challenging.

For all these reasons, most of the existing optimization apparatuses for standard lenses cannot be readily used with cameras having lenses with a non-uniform parameter. For some of the issues, as the deformed image of the objects, one solution is to modify the software programs. However, this solution is often not possible or desirable for the final user because it requires access to the source code, as well as the skill and the time to modify the program accordingly. Another solution could be to correct the non-uniformity in the image at the software level before using it in the existing optimization software programs. This idea is, however, often impossible because pre-processing the image has the undesirable effect of modifying or destroying some important characteristics of the original image, including the noise information or information found in the Bayer pattern from the sensor. In these cases, the optimization programs must be used on the raw images from the camera without any pre-processing.

For images from a wide-angle lens, in addition of the existing software being incompatible with the distorted images, the lack of charts or objects and the undesirable presence of other objects not normally imaged at the edge of the field of view are also problematic and make the automated tuning impossible. Also, the lower number of pixels on the objects of interest when viewed with wide-angle lenses affects the calculations, and even rewriting the program to adapt for the deformed shapes is not a workable solution because the metrics are not comparable with low numbers of pixels, as compared to standard lenses and the high number of pixels in their images for given objects.

Custom optimization apparatuses for systems having an optical lens with non-uniform parameters have been used in the past. When the non-uniform parameter is distortion, these include custom charts designed specifically to be independent of the image distortion, as proposed in U.S. Pat. No. 7,852,513, by using radially distributed color charts.

However, these charts require the use of a special software program and cannot be used with the existing software already programmed to use the existing standard charts. Also, because the center must be on the optical axis of the lens, radial charts can only be used in the center of the field of view of the distorting lens. Placed in any other part of the field of view, the shapes of these charts will be deformed in the images and unusable, greatly limiting their use to one chart at a time and at a fixed position in the center. An ideal optimization apparatus for lenses having optical distortion, including wide-angle lenses, should have many charts and objects located at various locations inside the field of view, and radial charts limited to the center cannot be used. Furthermore, the idea of a radial color chart cannot be used for other kinds of 2D or 3D objects, like resolution charts or human dummies.

Another issue is the lighting condition in existing optimization apparatuses. Many existing lens and camera optimization boxes have a highly controlled light intensity, uniformity, and spectrum in an area of the box where charts and objects are located, but have non-uniform light or even shadows present in other parts of the box not typically imaged by standard lenses. With wide-angle lenses having a field of view over 180°, the lens can see even behind the camera, and the existing boxes cannot be used to create uniform lighting conditions for the image.

Many existing systems and apparatuses have been proposed in the past to calibrate lenses with optical distortion, including in U.S. Pat. No. 8,619,248. However, these apparatuses are made of targets at exactly known locations and are used to measure the exact distortion profile of some lenses with optical distortion and cannot be used to produce images outputted from the camera that appear without optical distortion. These existing calibration method cannot be used with existing software programs used to calibrate, test, and tune standard optical lenses without optical distortion.

BRIEF SUMMARY OF THE INVENTION

To overcome all the previously mentioned issues, embodiments of the current invention describe a method to design a custom optimization apparatus according to one or more non-uniform parameters of the lens. The non-uniform parameter could be the distortion, the magnification, the relative illumination, the resolution, the image quality (MTF), the anamorphic ratio between two principal axes of magnification, or the like. Each object seen in the field of view of the lens with non-uniform parameters is designed to match an inverse of the non-uniformity from the lens for its given position in object space, as seen by the lens. The method for deforming the objects depends only on the knowledge of the profile of non-uniformity of the lens used for imaging. The method is therefore compatible with any lens, with any object shape, any object size, or any position of the object in the field of view.

An exemplary object is a common rectangular 2D object that is supposed to form a rectangular image when viewed through a standard uniform lens. For a lens where the non-uniform parameter is the presence of optical distortion, using the method of the present invention, the shape of the 2D object is modified according to the exact distortion profile of the lens. For a lens creating images with positive distortion, a negative distortion is applied to the originally rectangular 2D object such that the corners of the distorted object would be compressed toward the center in comparison with the original rectangular object. For a lens creating images with negative distortion, a positive distortion is applied to the originally rectangular 2D object such that the corners of the distorted object would be stretched away from the center in comparison with the original rectangular object. More generally, for any lens producing optical distortion, a distribution function between the object ray angle and the image height can be used to describe mathematically how the lens distorts the image and the resulting 2D or 3D object shape is determined by the inverse of this distribution function of the distorting lens.

When the pre-distorted object is positioned at the pre-calculated position in front of the distorting lens, the resulting image of the object appears as it would with the original object and a standard lens with uniform magnification. The image can then be used directly by all existing software programs made for standard lens calibration and tuning. This allows the use of existing software programs to calibrate and fine-tune the lens and camera system when access to the source code of the program is impossible or the time required to modify and adapt the code would be impractical. This method also allows working directly with the raw image from the camera instead of a processed image, which is essential for some optimization, such as any tuning that must be done on the raw image, e.g., noise or de-Bayer fileting.

To calculate the shape of the pre-distorted object, the following method is used. First, a 2D/3D digital file of the standard object having an original shape is created. Then, the required position in the image of the object and the required size in the image of the object to be viewed through the lens with a non-uniform parameter are determined. Using the distribution function of the non-uniform parameter of the lens or its inverse function, the angular coverage of the required object is determined. With this required angular coverage of the object calculated, the optimal combination of size and distance is selected. A new 2D/3D digital file is created for the pre-distorted object by calculating the color of each pixel. When the pre-distorted digital file is filled, the last step is to produce the real object itself, using any means of production, including, for example, a 2D or a 3D printer.

In an embodiment of the present invention, a general optimization apparatus for a family of optical lenses all having similar distortion profiles is used when the optimization allows it. In this case, the shape of the object is calculated by taking the average of the distribution function of all of the lenses to be optimized with this apparatus instead of using the single distribution function of a single lens. The optimization apparatus can then optionally be combined with a correction unit modifying the distortion of the resulting image. This correction unit corrects the difference between the exact distribution function of the lens having optical distortion and the average distribution used for building the general optimization apparatus. The shapes of the objects inside the resulting image after the correction by the correction unit is then the same as it would be when imaged with a standard lens.

In other embodiment of the present invention, the optimization apparatus is designed for wide-angle lenses where the non-uniform parameter is the relative illumination across the field of view. The optimization apparatus then includes custom non-uniform illumination that is designed to match the inverse of the relative illumination of the lens and camera systems. This way, the light level at the image across the field of view is more uniform, allowing, for example, a better fine tuning of image quality parameters (sharpness, contrast, de-noise, or the like) without having to adjust the gain of the camera in regions within the field of view.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustration, there are shown in the drawings embodiments which are presently preferred. It should be understood, however, that the invention is not limited to the precise arrangements and instrumentalities shown.

In the drawings.

DETAILED DESCRIPTION OF THE INVENTION

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the device and designated parts thereof. The terminology includes the above-listed words, derivatives thereof, and words of similar import. Additionally, the words "a" and "an", as used in the claims and in the corresponding portions of the specification, mean "at least one."

Figure 1:
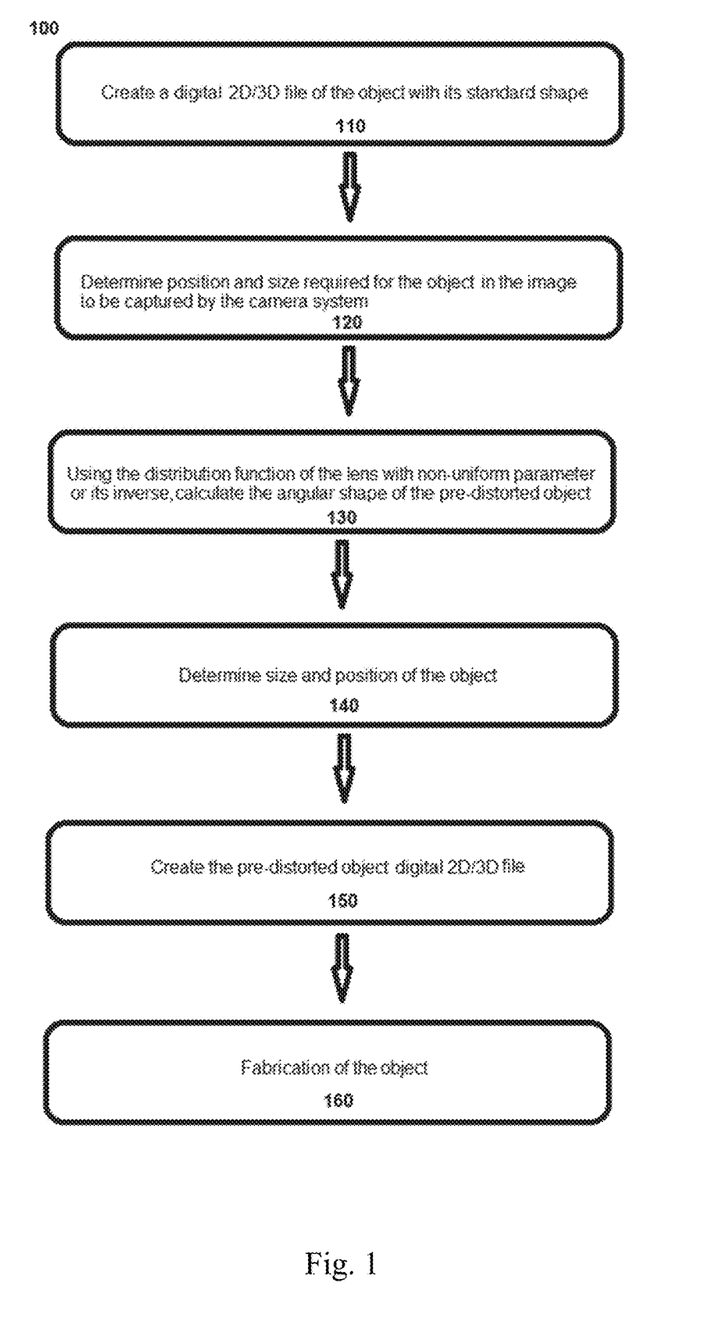
FIG. 1 is a flow diagram of a method for creating pre-distorted objects so that they appear normal when viewed through a lens having non-uniform magnification or optical distortion.

FIG. 1 is a flow diagram showing a method 100 used according to the present invention to calculate the shape of a pre-distorted object when the non-uniform parameter of the lens is optical magnification (the non-uniformity is also known as "optical distortion"). At 110, the first step is to create a digital file from a standard object with its original shape. The file can be in any 2D or 3D digital format, including but not limited to BMP, JPG, GIF, PNG, TIFF, or the like for 2D objects, and STEP, IGES, STL, CAD or the like for 3D objects. This file is preferably generated with a high enough resolution to make sure that after compressing portions of the image and stretching other portions, the number of pixels or detail in each zone is high enough for the features on the object to be recognized for the desired application. For this step 110, the original shape of the object is the shape as it would appear through a standard imaging lens without optical distortion and it is the shape that could be automatically analyzed by a program.

Then, at step 120, the required position, size and orientation in the image of the object when it will be viewed through the distorting lens are determined. Not only does this method work well for an object appearing perfectly in the center of the image, but also for an object that appears anywhere in the image plane of the distorting lens. By selecting the position, the size, and the orientation in the image of the object, one can make sure at this step that the resulting image works as desired with the required analysis and tuning program.

At step 130, the distribution function of the distorting lens, or its inverse function, is used to determine the angular coverage in the object space in front of the lens for the required object. In the presence of optical distortion, the non-uniform parameter is optical magnification and the distribution function or its inverse link together the object field angle as measured from the optical axis and the image height from a center of the image plane. This function is usually well known for lenses producing optical distortion. Alternatively, this function or its inverse can easily be measured in a laboratory with targets at a pre-calculated field angle position. The distribution function is in one dimension when the distorting lens has axial symmetry and has two dimensions when the distorting lens has no axial symmetry. Furthermore, the distribution function can either be in the format of a continuous mathematical function using trigonometric arguments, a polynomial expansion, or a look-up table where interpolation between two values is used when required.

With this calculated required angular coverage of the object as seen from the center of the distorting lens, there is still an infinite number of combinations between the size of the pre-distorted object and the distance from the lens. At step 140, the optimal combination of size and distance is selected for the object in the object space. The selected solution for the size and distance could be planar or not, depending on whether the original object is 2D or 3D and if the pre-distorted object is to be used on a flat surface or a curved surface.

At step 150, a new digital file is created for the pre-distorted object. This file can be a 2D image file or a 3D image file depending on whether the selected solution is planar or not. The required color of each pixel of the new digital image file is then sequentially calculated using the distribution function or its inverse to link them to the pixels of the original digital image file from step 110. Interpolation algorithms may be used to get the exact color of each pixel of the final pre-distorted image. This interpolation algorithm can be simply based on information from only the closest pixel to the position calculated by the distribution function or its inverse. Alternatively, it could be a more complex interpolation algorithm using the information from the pixels closest to the calculated position as well as information from its neighboring pixels to compute sequentially the color of each pixel in the final image file for the pre-distorted object.

When the pre-distorted digital file is filled, the last step 160 of the method is to prepare the physical object itself. This can be done using any means of production, including, for example, a 2D or a 3D printer or the like.

Figure 2:
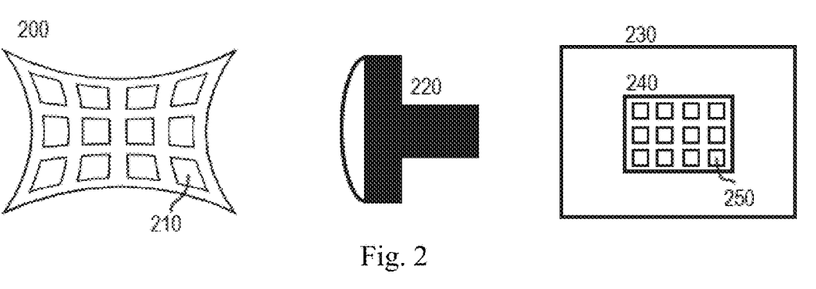
FIG. 2 shows a pre-distorted color chart with positive distortion imaged by a lens with negative optical distortion, creating a perfectly rectangular chart at the image plane.
Figure 3:
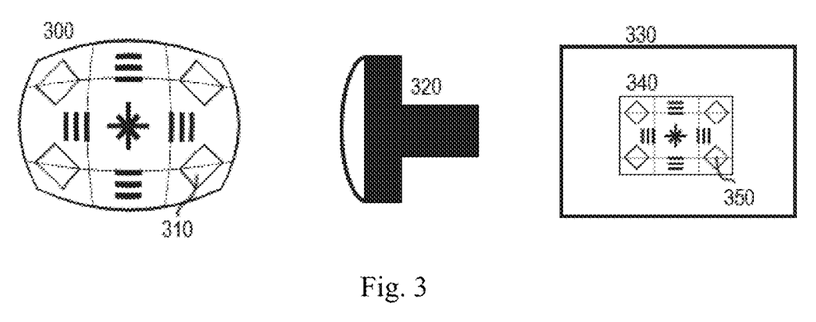
FIG. 3 shows a pre-distorted image quality chart with negative distortion imaged by a lens with positive optical distortion, creating a perfectly rectangular chart at the image plane.

In a preferred embodiment of the present invention, the object is a positioned on the optical axis of the distorting lens as in FIGS. 2 and 3.

FIG. 2 shows a pre-distorted color chart 200 with twelve color patches 210. In these color charts, each patch is of a precise color or shade of gray for tuning the color reproduction capabilities of the camera and lens system. In this example, the lens 220 has negative distortion, often called "barrel" distortion. For this reason, the chart 200 and each color patch 210 have been pre-distorted with positive distortion, often called "pincushion" distortion. At the image sensor 230 of the camera system, the image of the chart through the lens is formed. It can be seen that the image of the pre-distorted chart 200 is now perfectly rectangular at 240 and that each of the color patches 250 are also perfectly rectangular. Thanks to the method of the present invention, the image will thus be exactly identical as an image of the standard chart would be using a standard lens without optical distortion. Any software program designed to automatically analyze these kinds of rectangular color charts will be able to perform its calculation and tune the color performances of the lens and camera system automatically.

FIG. 3 shows a pre-distorted image quality chart 300 with various image quality features 310 drawn on it, including slanted edges, alternating black and white lines, and a star chart. In this example, the lens 320 has positive distortion (pincushion). For this reason, the chart 300 and each feature 310 have been pre-distorted with the corresponding negative distortion (barrel). At the image sensor 330 of the camera system, the image of the chart through the lens is formed. It can be seen that the image of the pre-distorted chart 300 is now perfectly rectangular at 340 and that each of the image quality features 350 are also perfectly straight. Thanks to the method of the present invention, the image will be exactly identical to an image of the standard chart viewed with a standard lens without optical distortion. Any software program that was designed to automatically analyze these kinds of rectangular image quality charts will be able to perform its calculation and tune the image quality settings (sharpness, contrast, de-noise, and the like) of the lens and camera system automatically.

Figure 4:
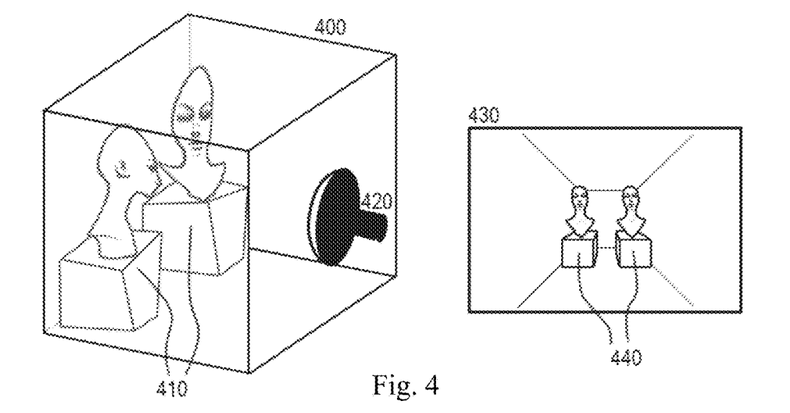
FIG. 4 shows dummy human faces as example objects placed at different positions of the field of view, with each face having a pre-distorted shape, to create faces with standard human proportions at the image plane.

In an alternate embodiment of the present invention, the objects are 3D objects, as shown in FIG. 4. FIG. 4 shows two pre-distorted 3D objects in the form of human face dummies 410. Depending on the position of each object in the optimization apparatus 400, as viewed in the field of view of the distorting lens, the shapes of the dummies 410 are different to account for the field dependent distortion profile of the lens 420. When imaged through the lens 420, the dummies 410 form an image at the sensor plane 430. The image 440 appears with perfectly standard human shape and ratio, allowing an evaluation of the image quality and the colors of the dummy 410 faces without additional processing. This is especially useful for tuning based on human observer objective perception of how a human face should appear in a perfect image.

Figure 5:
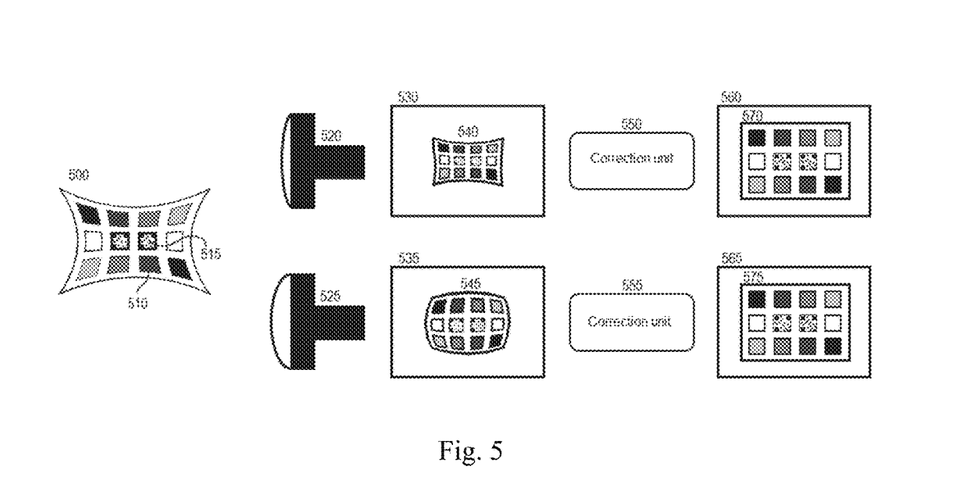
FIG. 5 shows a 2D object part of a general optimization apparatus compatible with multiple lenses with similar optical distortion; wherein an optional correction unit may correct the remaining distortion in the image from the camera to output a perfectly corrected image.

In another alternate embodiment of the present invention, a general optimization apparatus is designed to be compatible with more than a single lens with optical distortion as in FIG. 5. To design the shape 500 of the object, the method of FIG. 1 is used, replacing the specific distribution function of the lens with optical distortion by the average distribution function of all the lenses to be optimized on the general apparatus. Similarly, the shape 510 of each feature of the object is calculated by making the same change to the method of FIG. 1. Optional markers 515 can be added to the object or nearby. The marker 515 could contain some information on the exact average distortion used to design the apparatus as well as information about the position of the object relative to the optical lens. This information could be used by the optional correction units 550 and 555 later. When the general optimization apparatus is imaged by lenses 520 or 525 each having a different distortion profile, their respective cameras produce the images 530 and 535. For the case of the lens 520, the distortion is more positive than the average used for creating the general apparatus, and some positive distortion remains in the image 530, as seen by the shape 540 of the object. For the case of the lens 525, the distortion is more negative than the average distortion used for creating the general apparatus, and some negative distortion remains in the image 535, as seen by the shape 545 of the object. These images 540 and 545 having a low amount of remaining distortion may already be used by some automated software program for optimizing the camera system or by a human observer for analyzing the performances of the camera system. Optionally, in systems where the correction must be perfect and that the camera optimization does not require working on the original image to keep the raw image features, some software processing can be added. In this optional case, the images 540 and 545 from the camera systems could be processed by the correction units 550 or 555. This can be done with prior knowledge of the designed general apparatus already inside the correction unit or by reading the required information from the marker 515 on the objects. Additionally, this marker 515 could be used for error detection and correction, using the percentage of loss due to noise or distortion as a measure of the performances of the system and of the required correction of the distortion. These correction units 550 and 555 could be located anywhere, including inside the camera itself, on a device on which the camera is installed, or on a computer receiving the images from the lens and camera system. The correction unit 550 corrects the remaining positive distortion from image 530 and outputs image 560, while the correction unit 555 corrects the remaining negative distortion from image 535 and outputs image 565. The final result is that the shapes of the objects 570 and 575 that appear rectangular when imaged through a standard lens are now straight again and can be automatically analyzed by software programs or interpreted by human observers.

Figure 6:
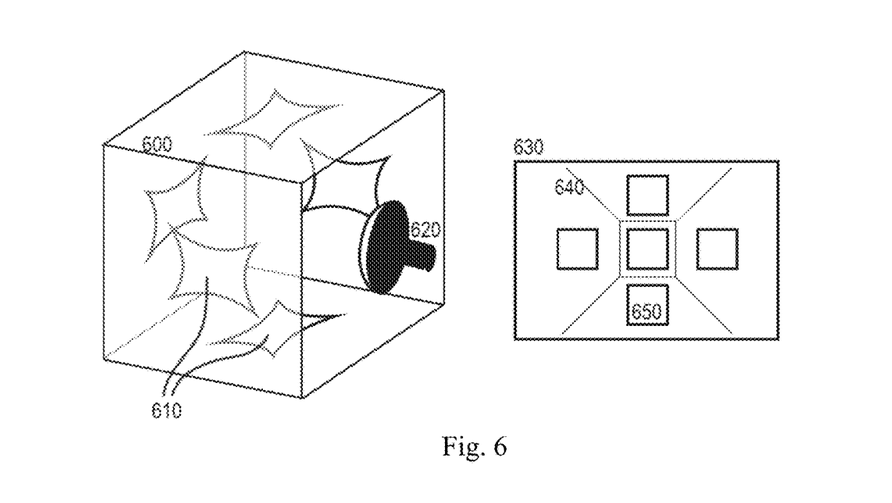
FIG. 6 shows five different pre-distorted charts placed on five different walls of a rectangular prism box; wherein specific shapes are used at each different position of the field of view of the lens and the shape of each chart is calculated to appear rectangular in the image plane.
Figure 7:
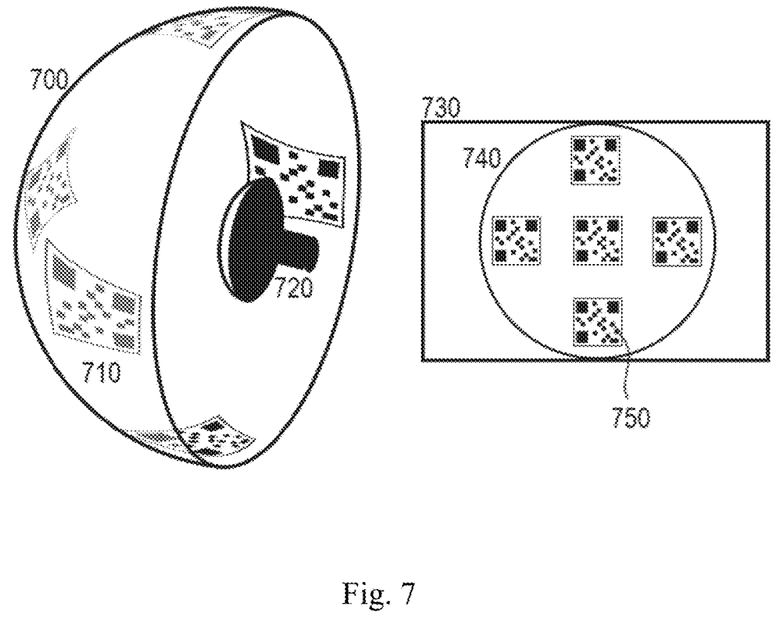
FIG. 7 shows different pre-distorted charts placed on a hemispheric box, wherein specific shapes are used at each different position of the field of view of the lens and the shape of each chart is calculated to appear rectangular in the image plane.

In other embodiments of the present invention, the apparatus includes full testing boxes, as in FIGS. 6 and 7.

FIG. 6 shows a rectangular test box 600 with various objects 610 on each of the five faces visible by the wide-angle lens having optical distortion 620. The shape of each object 610 has been calculated according to the method of the present invention and depends on the position of each object in the field of view of the lens. The image of the optimization apparatus at image sensor 630 appears straight at 640 and the image of each object 650 on the wall of the box is rectangular, as intended. All the objects can then be automatically analyzed by existing software programs that are compatible with straight objects, as they would be imaged through a standard lens.

FIG. 7 shows a hemispheric test box 700 with various image quality charts 710 spread across the total field of view of the wide-angle lens having optical distortion 720. The test box is not limited to an exact hemisphere and could be any section of a full sphere, including a hyper hemispheric box, a full spherical box, or the like. The shape of each chart 710 and its contents has been calculated according to the method of the present invention and depends on the position of each chart in the field of view of the lens. The image of the hemispheric optimization apparatus at image sensor 730 appears perfectly circular at 740 and the image of each chart 750 is straight as intended. All the charts can then be automatically analyzed by existing software programs that are compatible with standard image quality charts, as they would be imaged through a standard lens.

Figure 8:
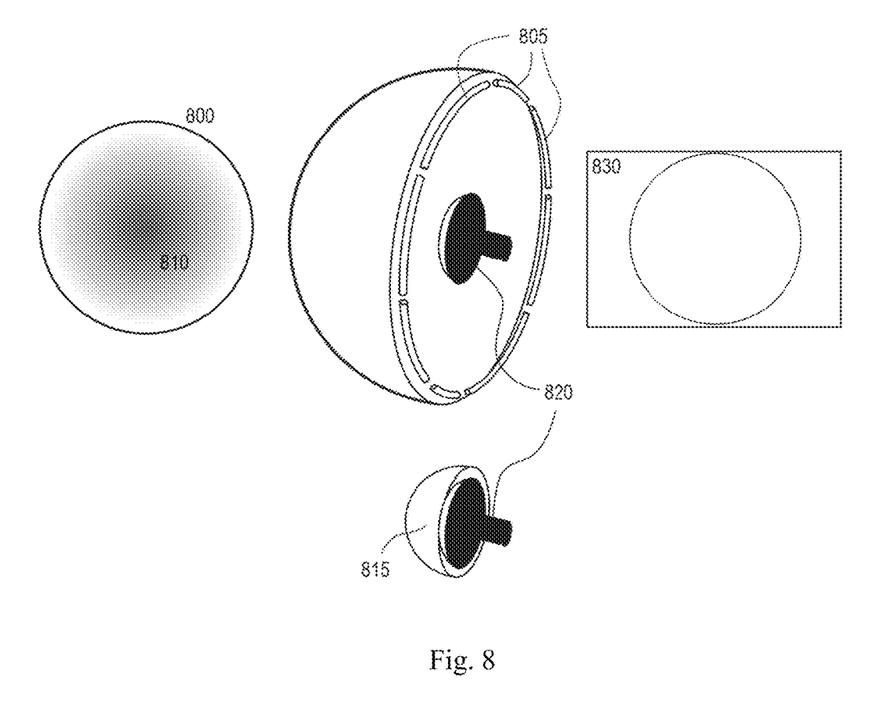
FIG. 8 shows an optimization apparatus in the shape of a hemispheric box with a non-uniform lightning condition to compensate for the relative illuminations drops due to the lens and camera systems.

In another embodiment of the present invention, the optimization apparatus includes special lighting, as seen in FIG. 8. The hemispheric box 800 is part of the optimization apparatus for the wide-angle lens with optical distortion. These lenses usually have non-uniform relative illumination across their field of view. The lights 805 are distributed to create non-uniform lighting intensity 810 on the hemispheric test box. In this example, the center is darker than the edge to compensate for the relative-illumination of the lens 820 that is higher in the center than at the edges. An optional spherical light diffuser 815 can be added between the hemispheric test box and the lens for precise measurements of the lens relative illumination departure when the lens is used in combination with a camera also producing a drop of illumination. These measurements can then be used to calibrate the lens roll-off of the lens and camera system. Alternatively, for wide-angle lenses producing black, unimaged corners, these measurements with a spherical light diffuser 815 could be processed in a software program that extend the relative illumination value toward the edges to fill the black corners by extrapolation, creating a full rectangular image with relative illumination directly compatible with existing roll-off correction software programs. When imaged through the lens 820, the resulting image has uniform lighting at the image sensor 830. This uniform lighting at the sensor allows to have more relevant results when the lens and camera system is tuned using automated software programs.

All of the above are figures and examples of optimization for lenses having a non-uniform parameter, for example, optical distortion. In all these examples, the imager can have any field of view, from very narrow to extreme wide-angle. This is not intended to be exhaustive list or to limit the scope and spirit of the present invention. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method for optimizing a camera with a non-transitory optimization software, the camera comprising a lens having at least one non-uniform parameter represented by a distribution function, the method comprising:
    a) creating a digital file of an original object;
    b) calculating a deformed shape of the object according to a predetermined position in an optimization apparatus and one of the distribution function of the lens or an inverse of the distribution function of the lens;
    c) creating a digital file of the deformed object;
    d) capturing an image of the optimization apparatus through a camera comprising a lens having the at least one non-uniform parameter, the captured image of the optimization apparatus including at least an image of the deformed object; and
    e) using the captured image of the deformed object in a non-transitory optimization software as an image from a regular lens without the at least one non-uniform parameter.

2. The method of claim 1, wherein the non-uniform parameter of the lens is one of distortion, magnification, relative illumination, resolution, image quality, or an anamorphic ratio between two principal axes.

3. The method of claim 1, wherein the lens having a non-uniform parameter is a wide-angle lens.

4. The method of claim 1, wherein the captured image is used in one of a manual or an automated analysis of the lens.

5. The method of claim 1, further comprising processing the captured image of the apparatus to further remove the non-uniformity.

6. The method of claim 5, wherein the processing is carried out based on one of prior knowledge of the optimization apparatus in a correction unit or information read from a marker.

7. The method of claim 1, wherein the optimization apparatus is a light box having non-uniform lightning across a field of view.

8. The method of claim 7, wherein the non-uniform lighting is designed to match an inverse of the relative illumination of the lens and a camera system used to image the optimization apparatus.

9. The method of claim 1, wherein the original object is one of a two dimensional object or a three dimensional object.

10. The method of claim 1, wherein the predetermined position of the object in the optimization apparatus in located on an optical axis of the lens.

11. The method of claim 1, wherein the optimization apparatus comprises a box having one of a rectangular shape, a spherical shape, a shape of a segment of a sphere.

12. The method of claim 1, wherein the distribution function is an average of a plurality of distribution functions, each distribution function being from one a different one of a plurality of lenses.

13. The method of claim 1, further comprising forming a marker on the digital file of the deformed object, the marker containing information regarding at least one of an average distortion used to create the optimization apparatus or a position of the object relative to a camera used to image the optimization apparatus.

14. The method of claim 1, further comprising forming a marker on the optimization apparatus, the marker containing information regarding at least one of an average distortion used to create the optimization apparatus or a position of the object relative to a camera used to image the optimization apparatus.

* * * * *